(12) United States Patent
Bobbitt, III et al.

(10) Patent No.: US 7,278,648 B2
(45) Date of Patent: Oct. 9, 2007

(54) ADJUSTABLE CONTROL ARM FOR VEHICLE SUSPENSION MECHANISMS

(75) Inventors: John Thomas Bobbitt, III, Evans, GA (US); David N. Schult, North Augusta, SC (US); Joseph Mark Butler, Martinez, GA (US)

(73) Assignee: Club Car, Inc., Augusta, GA (US)

( * ) Notice: Subject to any disclaimer, the term of this patent is extended or adjusted under 35 U.S.C. 154(b) by 305 days.

(21) Appl. No.: 11/037,528

(22) Filed: Jan. 18, 2005

(65) Prior Publication Data

US 2005/0212244 A1 Sep. 29, 2005

Related U.S. Application Data

(60) Provisional application No. 60/537,143, filed on Jan. 16, 2004.

(51) Int. Cl.
*B62D 17/00* (2006.01)
(52) U.S. Cl. .................. 280/86.751; 280/124.123; 280/124.127
(58) Field of Classification Search .......... 280/86.751, 280/124.16, 124.157, 124.123, 124.127 280/124.148, 124.138
See application file for complete search history.

(56) References Cited

U.S. PATENT DOCUMENTS

| | | | | |
|---|---|---|---|---|
| 2,483,619 | A * | 10/1949 | Brown et al. ............... 280/638 |
| 4,798,396 | A * | 1/1989 | Minakawa ........... 280/124.138 |
| 5,257,801 | A * | 11/1993 | Matsuzawa et al. .. 280/124.138 |
| 5,380,024 | A * | 1/1995 | Hayami ............... 280/124.143 |
| 5,700,025 | A * | 12/1997 | Lee ........................ 280/86.751 |
| 5,845,926 | A * | 12/1998 | Davis et al. .......... 280/124.136 |
| 6,293,561 | B1 * | 9/2001 | Goetzen et al. ............. 280/5.52 |
| 6,406,043 | B1 * | 6/2002 | Balmer .................... 280/124.1 |
| 6,446,991 | B1 * | 9/2002 | Klais ....................... 280/86.75 |
| 6,676,142 | B2 * | 1/2004 | Allman et al. ......... 280/86.751 |
| 7,168,717 | B2 * | 1/2007 | Wubben et al. ....... 280/124.127 |
| 2003/0111812 | A1 * | 6/2003 | Carlstedt et al. ....... 280/124.16 |
| 2005/0017471 | A1 * | 1/2005 | Kim ...................... 280/86.751 |
| 2006/0170176 | A1 * | 8/2006 | Wubben et al. ....... 280/124.127 |

* cited by examiner

*Primary Examiner*—Paul N. Dickson
*Assistant Examiner*—Timothy Wilhelm
(74) *Attorney, Agent, or Firm*—Michael Best & Friedrich LLP

(57) ABSTRACT

An adjustable control arm is for a suspension of a vehicle having a frame and at least one wheel. The control arm includes a first arm section connected with the frame and a second arm section connected with the wheel and coupled with the first arm section such that the second section is releasably fixable to the first section and alternatively slidably displaceable with respect to the first section so as to adjust camber of the wheel, the first and second arm sections remaining generally coupled together during displacement of the second section. Preferably, the first arm section has a cavity and the second arm section has an engagement portion disposed within the cavity, the engagement portion being fixedly connectable to the first arm section to releasably connect the two arm sections and alternatively displaceable within the cavity.

21 Claims, 10 Drawing Sheets

ADJUSTABLE CONTROL ARM FOR VEHICLE SUSPENSION MECHANISMS

This application claims priority to U.S. Provisional Application Ser. No. 60/537,143, filed Jan. 16, 2004, the entire contents of which are incorporated herein by reference.

BACKGROUND OF THE INVENTION

The present invention relates to vehicle suspension mechanisms, and more particularly to control arms of such suspension mechanisms.

Vehicles such as golf cars, utility vehicles, neighborhood vehicles, etc., typically include a frame and a plurality of wheels, generally four wheels, movably connected with the frame. Generally, each wheel is connected with the frame by means of a suspension mechanism that enables vertical displacement of the wheel with respect to the frame. To optimize performance of such vehicles, it is often necessary to adjust the "camber" of each wheel, which may be indicated by an angle between a generally vertical centerline through the wheel and a substantially vertical reference line.

SUMMARY OF THE INVENTION

In one aspect, the present invention is an adjustable control arm for a suspension of a vehicle, the vehicle including a frame and at least one wheel. The control arm comprises a first arm section connected with the frame and a second arm section connected with the wheel. The second arm section is coupled with the first arm section such that the second section is releasably fixable to the first section and is alternatively displaceable with respect to the first section so as to adjust camber of the wheel. The first and second arm sections remain generally coupled together during displacement of the second section.

In another aspect, the present invention is also a suspension mechanism for a suspension of a vehicle, the vehicle including a frame and at least one wheel. The suspension mechanism comprises a fixed control arm having a first end connected with the frame and a second connected with the wheel. The fixed arm having being formed such that a distance between the arm first and second ends remains substantially constant. An adjustable control arm is spaced vertically from the fixed control arm and includes a first arm section connected with the frame and a second arm section connected with the wheel. The second arm section is coupled with the first arm section such that the second section is releasably fixable to the first section and is alternatively displaceable with respect to the first section so as to pivot the wheel about the fixed arm second end to adjust camber of the wheel.

In a further aspect, the present invention is again an adjustable control arm for a suspension of a vehicle including a frame and at least one wheel. The control arm comprises a first arm section connected with the frame, a second arm section connected with the wheel and means for coupling the first and second arm sections such that the second arm section is releasably fixable to the first arm section and alternatively slidably displaceable with respect to the first section to adjust camber of the wheel.

In yet another aspect, the present invention is again an adjustable control arm for a suspension of a vehicle that includes a frame and at least one wheel. The control arm comprises a first arm section providing an inner arm end connected with the frame and a second arm section providing an outer arm end connected with the wheel. The second arm section is coupled with the first section such that the second section is releasably fixable to the first section to maintain a spacing distance between the frame and the wheel at a particular value. Alternatively, the second arm section is slidably displaceable with respect to the first section to vary the spacing distance value so as to adjust camber of the wheel.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
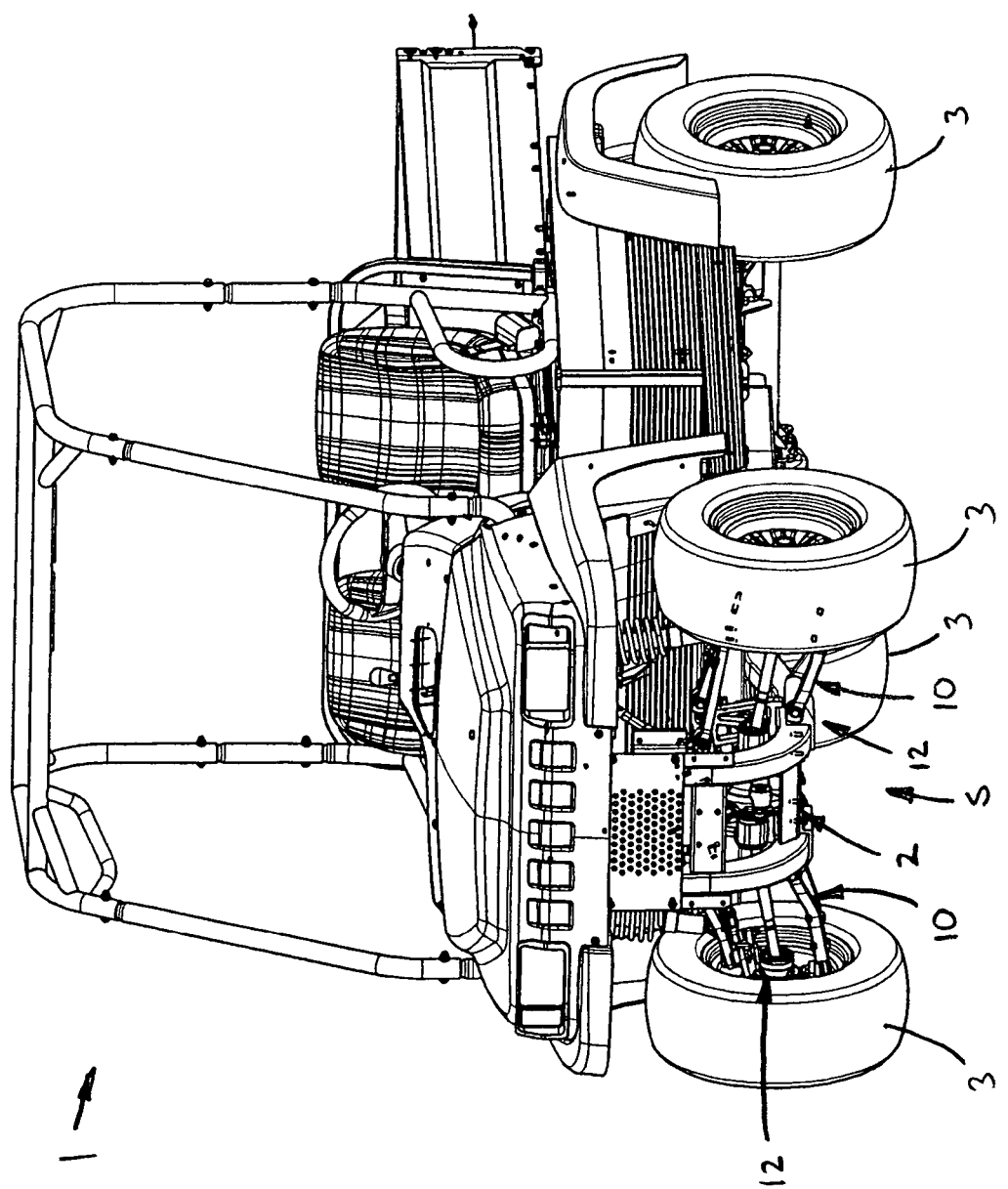
FIG. 1 is a perspective view of a vehicle having at least two adjustable control arms in accordance with the present invention.
Figure 2:
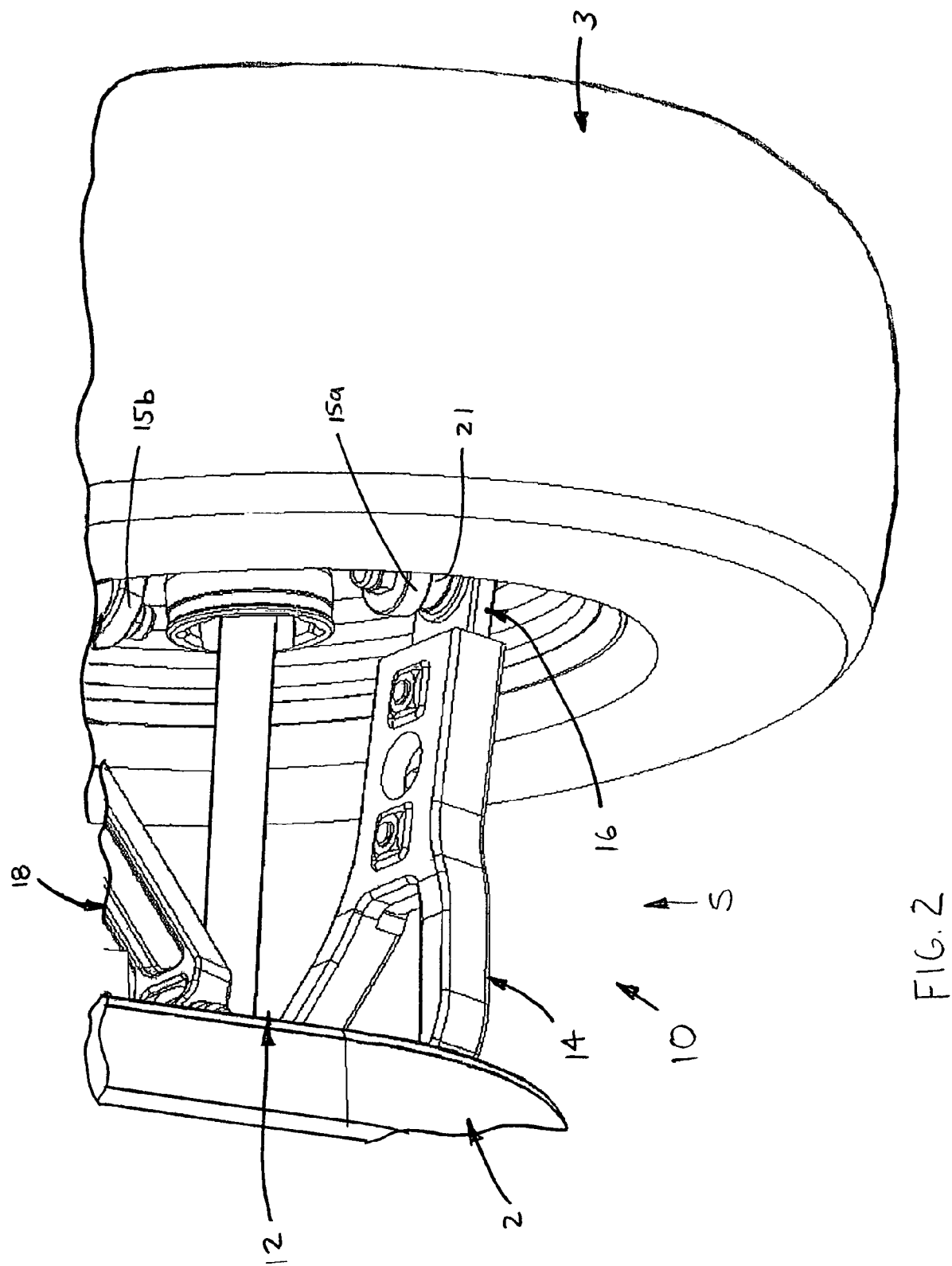
FIG. 2 is an enlarged, broken-away perspective view of a vehicle suspension mechanism with an adjustable control arm in accordance with the present invention.

Certain terminology is used in the following description for convenience only and is not limiting. The words "lower", "upper" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words or similar import.

Referring now-to the drawings in detail, wherein like numbers are used to indicate like elements throughout, there is shown in FIGS. 1-15 an adjustable control arm 10 for a suspension S of a vehicle 1, in accordance with the present invention. The vehicle 1 including a frame 2 with a longitudinal centerline 2a and at least one and most preferably four wheels 3 rotatably connected with the frame 2. Preferably, at least two of the wheels 3, most preferably the front wheels 3, are each movably connected with the frame 2 by a separate suspension mechanism 12 that includes one of the adjustable control arms 10. Thus, the suspension S includes at least two suspension mechanisms 12 for the front wheels 3, and may include four mechanisms 12 for all four wheels 3. Each adjustable control arm 10 has a generally longitudinal centerline 11 extending between the frame 2 and the wheel 3 and basically comprises a first arm section 14 providing an inner arm end 10a connected with the frame 2 and a second arm section 16 providing an outer arm end 10b connected with one wheel 3. The second arm section 16 is coupled with the first arm section 14 such that the second section 16 is releasably fixable to the first section 14 and alternatively displaceable with respect to the first section 14 so as to thereby adjust camber C of the connected wheel 3. As is known to those skilled in the art of vehicle suspensions, "camber" is a measure of the vertical orientation of a wheel, and is indicated in the drawing figures with reference to the angle C between a generally vertical centerline 3a extending through each wheel 3 and a substantially vertical reference line V, as best shown in FIGS. 14 and 15.

Further, the two ends 10a, 10b of the adjustable control arm 10 are separated by a spacing distance $d_S$ that defines the overall length $L_O$ of the arm 10, and thus also the distance (not indicated) between the frame 2 and the wheel 3. When the second arm section 16 is releasably connected with or fixed to the first arm section 14, the spacing distance $d_S$ is maintained at a particular value $d_{Sn}$, e.g., $d_{S1}$ or $d_{S2}$ shown in FIGS. 14 and 15. As is readily apparent, the two arm sections 14, 16 are releasably fixed or connected together during normal vehicle operation, and thus the arm length $L_O$ and the spacing distance $d_S$ remain substantially constant. However, when it is desired to adjust the wheel camber C, the second arm section 16 is released or disconnected from the first section 14 so that the second section 16 is displaceable relative thereto. Movement of the second arm section 16 varies the spacing distance $d_S$ and causes the wheel 3 to pivot with respect to the frame 2 to adjust the wheel camber C. In other words, wheel camber C is varied or adjusted by changing the overall length $L_O$ (e.g., $L_{O1}$, $L_{O2}$) of the connected control arm 10 so as to pivot or angularly displace the connected wheel 3, as depicted in FIGS. 14 and 15.

Figure 14:
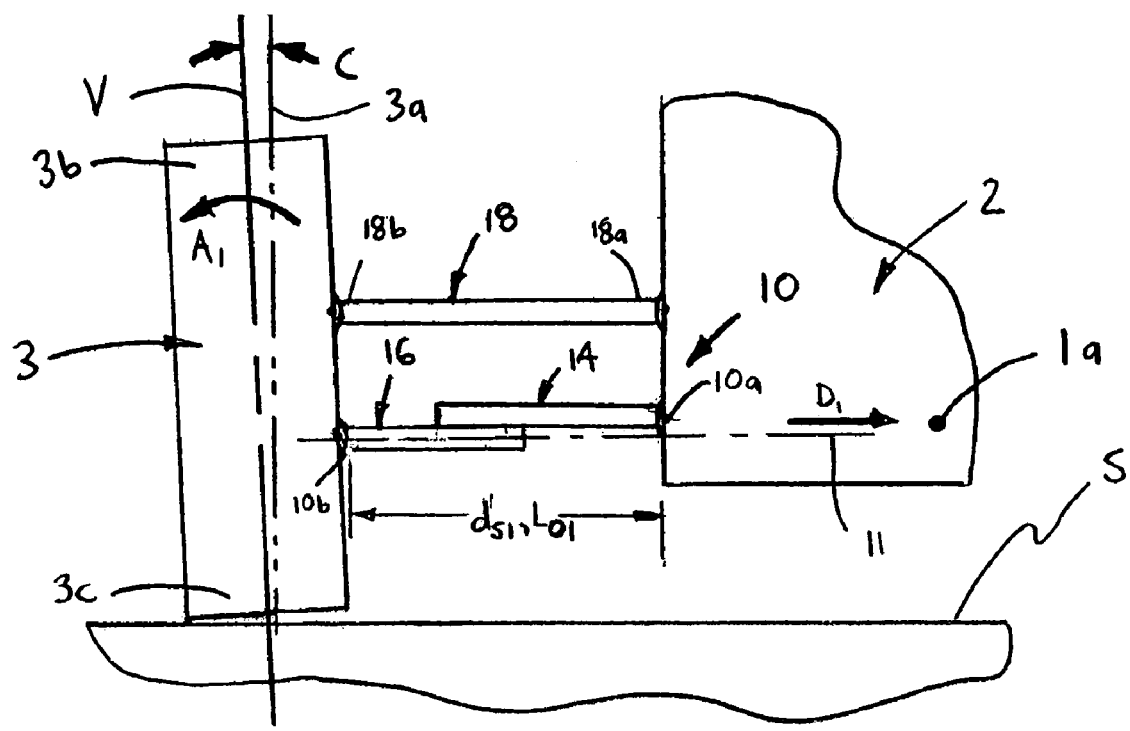
FIG. 14 is a more diagrammatic view of a suspension including the adjustable control arm, showing the second arm section located at a relatively more inward position with respect to the first arm section.
Figure 15:
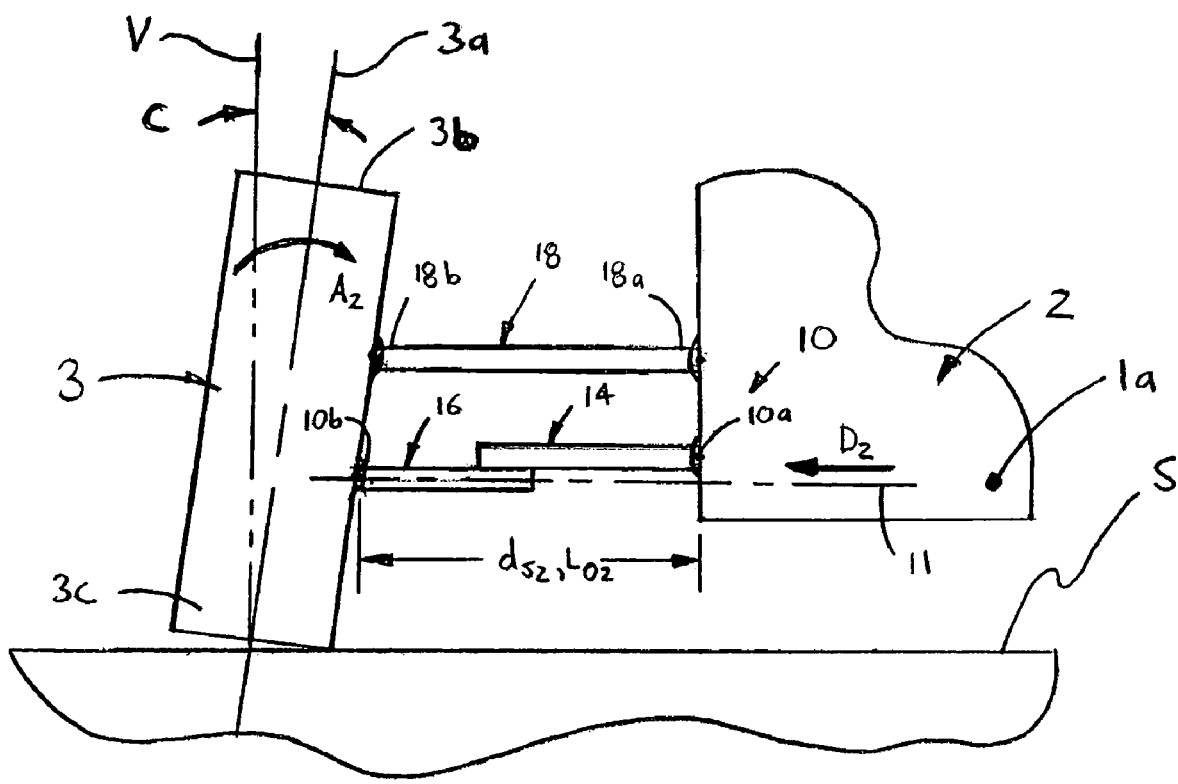
FIG. 15 is another view of the suspension of FIG. 14, showing the second arm section located at a relatively more outward position with respect to the first arm section.

More specifically, the second arm section 16 is displaceable along the centerline 11 in a first, inward direction $D_1$ generally toward the vehicle frame 2 and centerline 1a, thereby decreasing the spacing distance (e.g., $d_S = d_{S1}$) and the control arm overall length (e.g., $L_O = L_{O1}$) as indicated in FIG. 14. As the second arm section 16 displaces toward the vehicle frame 2, the wheel 3 pivotally displaces in a first angular direction A1 so that the wheel lower end 3c moves generally toward the vehicle frame 2 and/or the wheel upper end 3b moves generally away from the frame 2. Alternatively, the second arm section 16 is displaceable along the centerline 11 in a second, opposing direction $D_2$ generally away from the vehicle frame 2 and centerline 1a, thereby increasing the spacing distance ($d_{Sn} = d_{S2}$) and the arm overall length ($L_{On} = L_{O2}$), as shown in FIG. 15. When the second arm section 16 displaces away from the vehicle frame 2, the wheel 3 pivotally displaces in a second angular direction $A_2$, such that the wheel upper end 3b moves generally toward the vehicle frame 2 and/or the wheel lower end 3c moves generally away from the frame 2.

In this general manner, the second arm section 16 is positioned with respect to the first arm section 14 as necessary to adjust the camber C of the wheel 3 to a desired value so as to optimize vehicle performance. When the camber C is adjusted to a desired angular value, the second arm section 16 is "reaffixed" or fixedly connected to the first arm section 14 to prevent relative displacement between the two arm sections 14, 16, thereby maintaining wheel camber C generally at the desired value.

Figure 4:
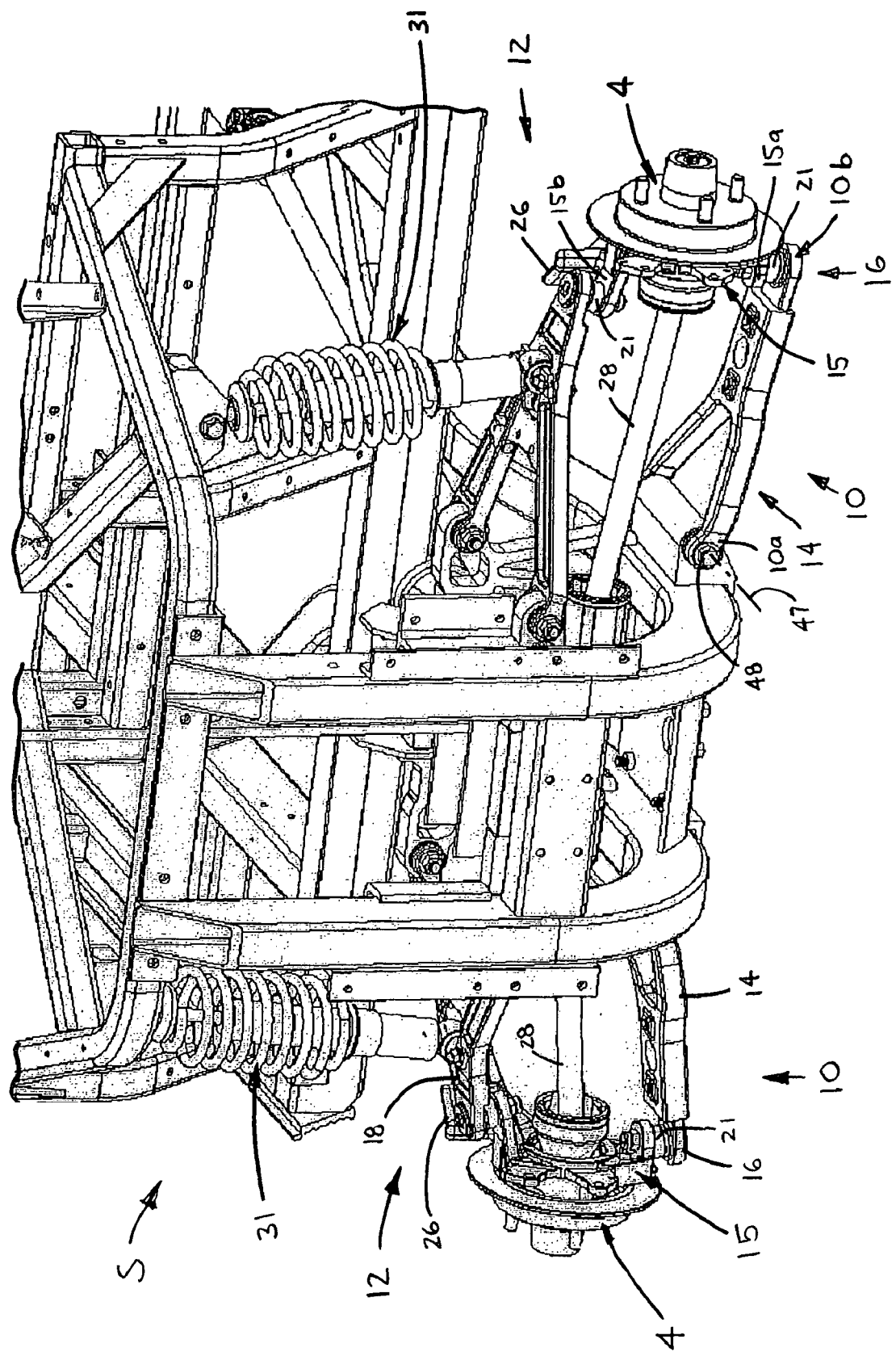
FIG. 4 is a partly broken away, perspective view of a vehicle frame and two suspension mechanisms, each including one of the adjustable control arms.
Figure 5:
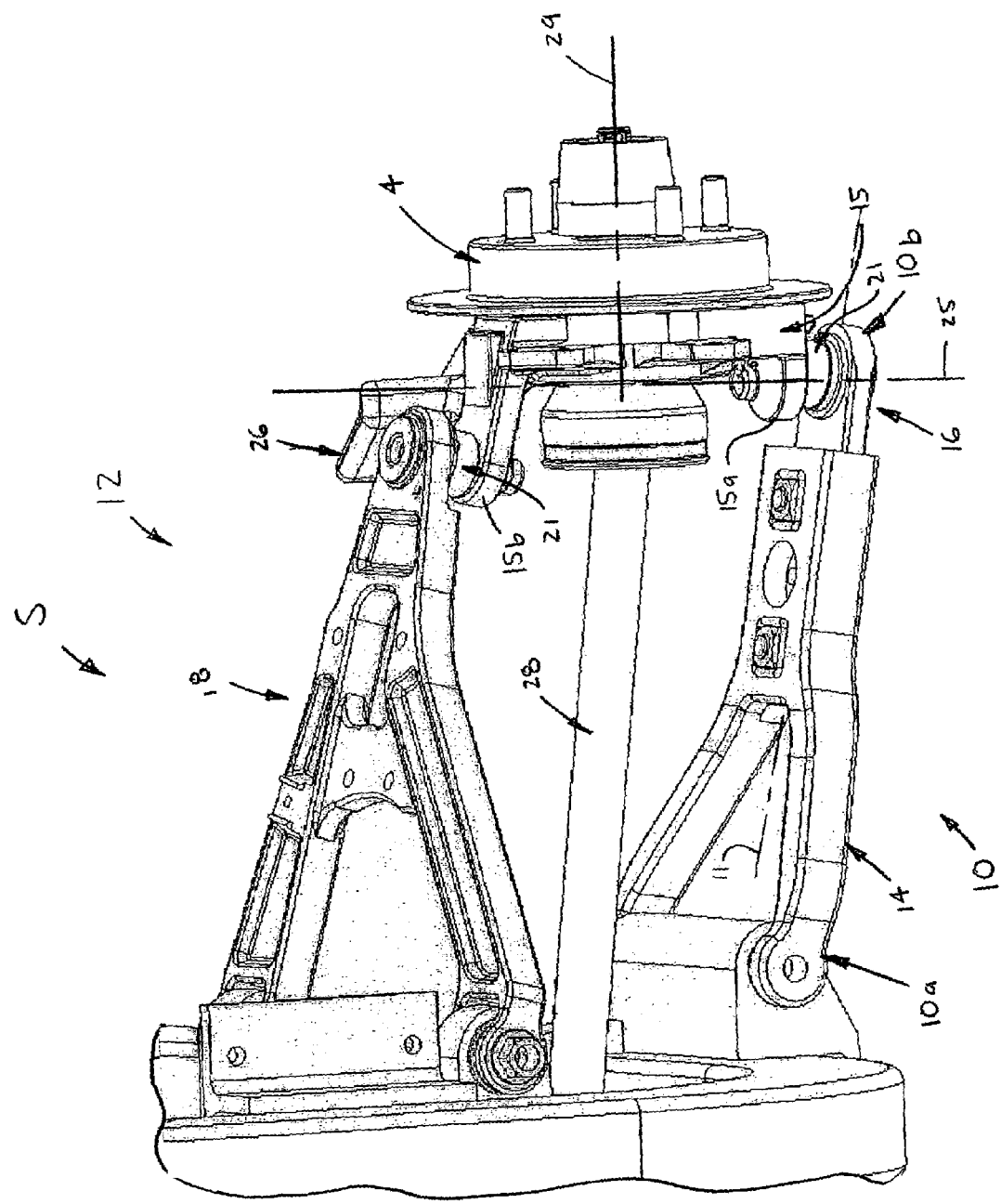
FIG. 5 is an enlarged, partly broken-away perspective view of the suspension mechanism with the adjustable control arm.
Figure 6:
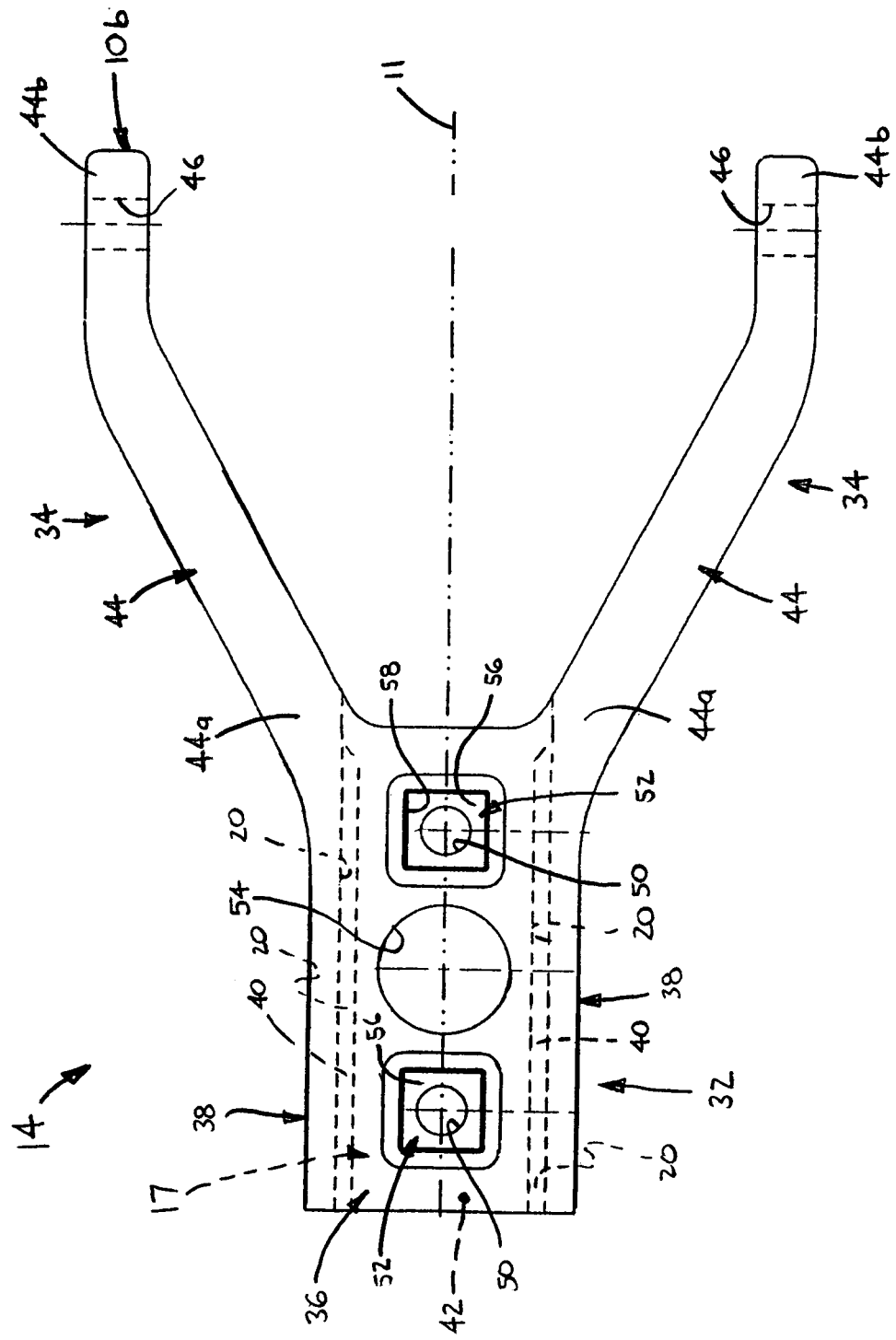
FIG. 6 is a top plan view of a first arm section of the adjustable control arm.

Referring to FIGS. 4 and 5, each suspension mechanism 12 preferably further includes an "upright member" or wheel support 15 with lower and upper ends 15a, 15b, the associated wheel 3 being generally mounted to support 12, preferably through a hub 4 as discussed below. The second arm section 16 is connected with one of the two support ends 15a, 15b, preferably the lower end 15a, and most preferably by means of a ball joint member 21 (described below). Further, the vehicle frame 2 is coupled with the other support end 15b or 15a, respectively, preferably with the upper end 15b. With this structure, displacement of the control arm second section 16 with respect to the first section 14 pivots the support 15 with respect to the vehicle frame 2, so as to thereby adjust camber C of the connected wheel 3. Although the wheel support 15 is presently preferred, the suspension mechanisms 12 may each alternatively include a spindle member (not shown) or other structural member for connecting the adjustable control arm 10 and other suspension components (e.g., a fixed control arm, shock absorbers, etc.) with a wheel 3.

Furthermore, each adjustable control arm 10 is preferably incorporated into a double-arm or "double-A arm" suspension mechanism 12 that further includes a non-adjustable, fixed length control arm 18, as mentioned above. The "fixed" control arm 18 is preferably spaced vertically from the adjustable control arm 10, most preferably vertically above, and is connected with the wheel support upper end 15a to couple the support upper end 15a with the vehicle frame 2. As such, the two control arms 10, 18 and portions of the frame 2 and the support 15 form a vertically movable four bar mechanism, as discussed in further detail below. Further, the fixed control arm 18 has an inner end 18a pivotally connected with the frame 2 and an outer end 18b pivotally connected with the support upper end 15a (and thus one wheel 3), the distance (not indicated) between the two ends 18a, 18b remaining substantially constant. Preferably, the fixed arm outer end 18*b* is pivotally connected with the support 15 by a ball joint member 21, such that the support 15 is pivotable about the fixed arm 18 in both vertical and horizontal directions, as discussed in further detail below.

Further, as each control arm 10, 18 is preferably connected with the support ends 15*b*, 15*a* by a separate ball joint member 21, the wheel 3 is pivotally displaceable with respect to the vehicle frame 2 (i.e., through movement of the support 15) without pivoting the control arms 10, 18 relative to the frame 2. Thus, with the preferred suspension mechanism 12, slidable displacement of second arm section 16 with respect to the first arm section 14 causes the support 15, and thereby the wheel 3, to pivot about the two control arm outer ends 10*b*, 18*b* so as to angularly displace with respect to the vehicle frame 2 to attain a desired camber C of the wheel 3. Although the above-described double-arm suspension mechanism 12 is preferred, the adjustable control arm 10 may be used with any other appropriate type of suspension mechanism 12, for example a McPherson type of suspension, as discussed below, such that the wheel 3 and support 15 may be connected with the vehicle frame 2 by other means, such as by a shock absorber or strut (not shown).

Referring now to FIGS. 3 and 6-13, each adjustable control arm 10 is preferably constructed such that one two arm sections 14, 16, preferably the first arm section 14, has a generally longitudinally-extending slot or cavity 17 and the other arm section 16, 14, preferably the second arm section 16, has an engagement portion 19. The engagement portion 19 is disposed within the cavity 17 so as to couple the two arm sections 14, 16 and is fixedly connectable to the one arm section (e.g., first arm section 14) to releasably connect the second arm section 16 with the first arm section 14. Alternatively, the engagement portion 19 is linearly displaceable within the cavity 17 when the second arm section 16 displaces with respect to the first arm section 14 (i.e., to adjust wheel camber C).

Preferably, the first arm section 14 includes a main body portion 32 with a generally rectangular-shaped, partially open channel 42 providing the cavity 17 and the second arm section 16 includes a rectangular bar or plate 60 at least partially disposed within the channel 42, as described in further detail below. However, the cavity 17 and the engagement portion 19 may each have any other appropriate structure or shape, such as for example, a circular cavity and mating circular bar, an enclosed square cavity and a mating square bar, etc. Further, the cavity 17 is preferably at least partially bounded or defined by at least one pair of generally facing "rail" surfaces 20 and the engagement portion 19 is preferably formed as a slide portion 22 disposed against and between the rail surface(s) 20 to thereby couple the two arm sections 14, 16.

With-the above structure, the slide portion 22 is slidably displaceable against and/or along the rail surface(s) 20 so as to vary the control arm overall length $L_O$ and thereby adjust the wheel camber C. Although at least one pair of rail surfaces 22 is preferred, the cavity 17 may be bounded by a single rail surface, such as for example, with a cavity 17 defined by a circular cylindrical interior surface (not shown). Additionally, the adjustable control arm 10 may be formed without a cavity and instead having separate structural members, such as one or more pairs of spaced-apart elongated bars or rails (none shown) providing at least one pair of rail surfaces 20 to retain an engagement portion 19.

Furthermore, the preferred one or more pairs of rail surfaces 20 each preferably extend generally parallel with respect to, and are disposed on opposing sides of the arm centerline 11. As such, the engagement slide portion 22, and thus the entire second arm section 16, slidably displaces generally linearly along the centerline 11. Alternatively, the adjustable control arm 10 may be constructed such that the second arm section 16 includes the cavity 17 and/or the rail surface(s) 20 and the first arm section 14 includes the engagement portion 19, such that the rail surface(s) 20 displace about or upon an engagement portion 19 that remains relatively stationary.

Having described the basic elements of the present invention above, each of these and other components of the adjustable control arm 10, and the suspension mechanism 12 incorporating the arm 10, are described in further detail below.

Referring first to FIG. 1, the adjustable control arm 10 of the present invention is preferably used on a vehicle 1 that is constructed as a golf car (as depicted), a utility vehicle, a Neighborhood vehicle ("NV"), or any other similar type of relatively lightweight vehicle. However, the adjustable control arm 10 may alternatively be used with any other type of vehicle 1, such as a passenger automobile, a Sports Utility vehicle, a truck, etc. Preferably, each of the front wheels 3 of the vehicle 1 includes a hub 4, preferably rotatably connected with the support 15 to mount the remainder of the wheel 3 thereto. Further, each of the vehicle front wheels 3 further includes a steering lever 26 attached to, and preferably integrally formed with, the support 15. A steering arm (not shown) is attached to the steering lever 26 and is displaceable in transverse directions with respect to the frame 2 so as pivot the lever 26, and thereby the support 15, the hub 4 and wheel 3, about a vertical axis 25 (FIG. 5) extending through the outer ends 10*b*, 18*b* of the respective control arms 10 and 18. However, each of the suspension mechanisms 12 used for the vehicle rear wheels 3 may or may not include a steering lever, depending on whether it is desired to provide the vehicle 1 with two or four wheel steering, and thus may also be constructed without a wheel support and instead with control arms 10, 18 connected directly with the hubs 4.

Furthermore, for each driven wheel 3, preferably at least the two rear wheels 3, a rotatable axle or half shaft 28 extends generally between the two control arms 10, 18 and is attached to the hub 4, the shaft 28 preferably being configured to rotatably drive a central portion of the hub 4 (and thus the wheel 3) about a generally horizontal axis 29 (FIG. 5). However, for the non-driven wheels 3, the hubs 4 and/or other support structure may rotatably support the associated wheel 3 such that the wheel 3 merely rolls upon a ground surface. Also, a spring and shock absorber unit 31 (FIG. 4) preferably extends between the vehicle frame 2 and the fixed control arm 18, but may alternatively be connected to the first or second sections 14, 16 of the adjustable control arm 10, and functions to dampen vertical vibrations of the suspension mechanism 12 and the frame 2.

As discussed above, although the adjustable control arm 10 is preferably used in a double arm type of suspension mechanism 12 that includes two control arms 10, 18 (as depicted), the adjustable control arm 10 may be incorporated in any other appropriate type of suspension mechanism 2. For example, the adjustable control arm 10 may be the sole control arm of a McPherson suspension mechanism (not shown) having a spring/shock absorber unit 31 attached directly to the support 15, or alternatively to a spindle or other support structure (none shown), and thus formed without a second arm (i.e., fixed arm 18). The adjustable control arm 10 may be used with these or any other suspension mechanisms and the scope of the present invention is not limited by the application of the control arm 10 to any specific type of suspension mechanism.

Referring now to FIGS. 6-8 and 9-12, the first arm section 14 preferably includes a generally "A" or "Y" shaped body 30 having the main body portion 32 (discussed above) and two leg portions 34 extending outwardly from the main portion 32 in diverging directions. As described above, the main body portion 32 provides the cavity 17 and rail surface(s) 20 and preferably includes a base wall 36 and two generally parallel rail walls 38 each extending generally perpendicularly from a separate one of the longitudinal side edges of the base wall 36. Each rail wall 38 includes an elongated ledge 40 extending transversely and inwardly toward the ledge 40 of the other rail wall 38. With such structure, the base wall 36, rail walls 38, and ledges 40 provide a cavity 17 formed as a partially enclosed, elongated rectangular-shaped channel 42 is formed in the first arm section 14, the channel 42 being bounded by the rail surfaces 20 as discussed above. Specifically, each wall 36, 38 and ledge 40 has an interior surface providing one of the rail surfaces 20.

With this structure, the engagement slide portion 22 of the second arm section 16 is disposeable within the rectangular channel 42 and is slidably retained (i.e., when the two arm sections 14, 16 are unfixed or detached) both between the two rail walls 38 and between the base wall 36 and the two ledges 40. Alternatively, the first section main body portion 32 may be formed in any other appropriate manner capable of slidably retaining or coupling with the slide portion 22 of the second arm section 16. For example, the main body portion 32 may be formed as a bar or tube with an enclosed longitudinal bore (not shown), the bore providing the rail surface(s) 20 and formed with transverse cross-sections of rectangular, circular, ovular or other shape.

Preferably, each leg portion 34 is formed as a generally rectangular-shaped bar 44 having a first end 44a attached to the main body portion 32 and an opposing free end 44b, the two free ends 44b providing the control arm inner end 10a. Each bar free end 44b is formed so as to be rounded and enlarged with respect to the remainder of the particular leg portion 34 and includes a bearing opening 46. The two bearing openings 46 are generally aligned with each other such that a pivot rod 48 is insertable through the two openings 46 to pivotally connect the first arm section 14, and thereby the adjustable control arm 10, with the vehicle frame 2, as best shown in FIG. 4. As such, the first arm section 14, and thus the entire adjustable control arm 10, is pivotable about a generally horizontal axis 47 (FIG. 4) extending through the two arms ends 44a so as to be angularly displaceable with a generally vertical plane.

Figure 7:
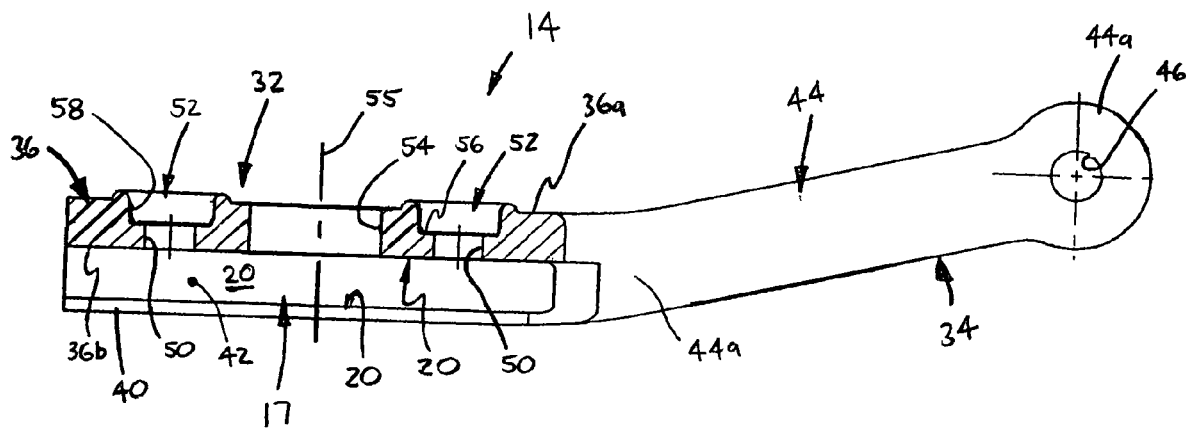
FIG. 7 is a side cross-sectional view of the first arm section taken through an arm centerline.
Figure 8:
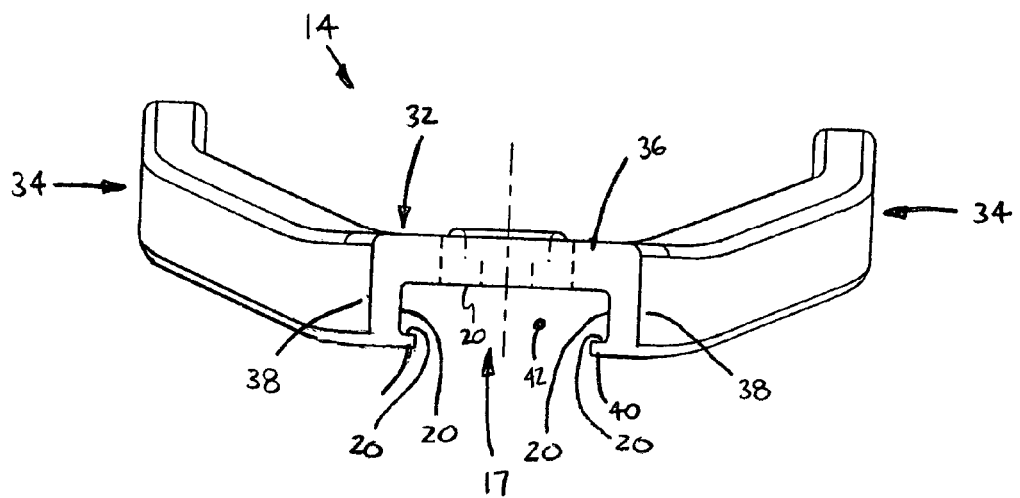
FIG. 8 is a front plan view of the first arm section.

Further, the first arm section 14 preferably further includes at least one and preferably two fastener clearance holes 50 extending through the base wall 36 of the main body portion 32. Each fastener hole 50 is sized such that a portion of a separate fastener 51, as discussed below, is disposeable through the particular hole 50 with clearance, although the holes 50 may alternatively be threaded and configured to threadably engage with the associated fastener 51. Further, the base wall 36 also preferably includes two nut-retaining recesses 52 extending inwardly from the outer surface 36a, with each clearance hole 50 preferably extending from a separate recess 52 to the base wall inner surface 36a, as best shown in FIG. 7. Each retaining recess 52 is preferably rectangular-shaped, but may have any other appropriate shape (e.g., hexagonal), and are each sized to receive a nut 53 (discussed below). Specifically, each recess 52 preferably provides both a nut clamping surface 56 disposed about the associated hole 50 and a retainer surface 58 configured to prevent rotation of the nut 53, as described below. In addition, the first arm section 14 also preferably includes a generally circular tool opening 54 disposed generally between the two fastener holes 50. The tool opening 54 is sized to receive a portion of an adjustment tool 70 (described below) and has a centerline 55 that extends generally vertically when the adjustable control arm 10 is assembled in the suspension 12, for reasons discussed below.

Although preferably formed as described above, the first arm section 14 may be formed in any other appropriate manner that enables the control arm 10 to function generally as described herein. For example, the first arm section 14 may be constructed with none, one, or three or more clearance holes 50, formed without a tool opening 54, and/or formed such that the two arm sections 14, 16 are slidably adjusted or releasably connected by another appropriate means, such as a separate clamp, a removable key, etc. (no alternatives shown). Further for example, the first arm section 14 may be formed with only a single leg portion 34, with only a main body portion 32, or constructed as a bar or plate having a slide portion 22 configured to engage with rail surfaces 20 on the second arm section 16. As yet another example, the first arm section 14 may even be formed without either a rail surface(s) or a slide portion and instead formed with one or more longitudinally extending slots configured to receive a projection (or other similar member) to slidably couple the two arm sections 14, 16, or formed with such a coupling member(s) engageable with a slot(s) on the second arm section 16 (no alternatives shown).

Referring now to FIGS. 3 and 9-11, the second arm section 16 preferably includes a generally flat, generally rectangular elongated body or plate 60, as mentioned above. The plate-like body 60 has an inner end 60a connected with the first arm section 14 and an outer end 60b connected with the associated wheel 60 and providing the control arm outer end 10b, as discussed above. Further, the second arm body 60 includes the engagement portion 19, preferably formed as the slide portion 22, extending inwardly from the inner end 60a and a connective portion 62 extending inwardly from the outer end 60b and configured to connect with the associated wheel 60, specifically through the support 15. The slide and connective portions 22, 62 are preferably integrally formed and have generally identical dimensions such that there is no apparent division or discernable transition between the two portions 22, 62. However, the body 60 of the second arm section 16 may alternatively be constructed in any other appropriate manner, such as being fabricated of two or more body pieces connected or attached together by any appropriate means, of a single piece having two or more dimensionally distinct portions, etc. (no alternative shown).

As discussed above, the slide portion 22 is sized so as to be insertable into and disposeable within the rectangular channel 42 of the first arm section 14, to thereby couple the second arm section 16 with the first arm section 14. More specifically, the body 60 preferably has opposing side surfaces 61A, 61B that are slideable against the rail surfaces 20 provided by the rail walls 38, an upper surfaces 63A that is slideable against the rail surface 20 provided by the base wall inner surface 36b, and a lower surface 63B that is slidable upon the two rail surfaces 20 provided by the ledges 40. However, as discussed above, the second arm section 16 may alternatively be formed with a cavity 17 or with other wall sections that provide the rail surfaces 20, with one or more longitudinal slots configured to receive a projection or similar coupling member attached to the first arm section 14. Further, for example, the second arm section 16 may be formed as a solid cylindrical bar or tube of any appropriate shape (e.g., rectangular, circular, ovular, etc) and sized to fit within a correspondingly shaped channel in the first arm section 14, or in any other appropriate manner that enables the two arm sections 14, 16 to be linearly, and preferably slidably, displaceable with respect to each other when unconnected (no alternative structures shown).

Figure 9:
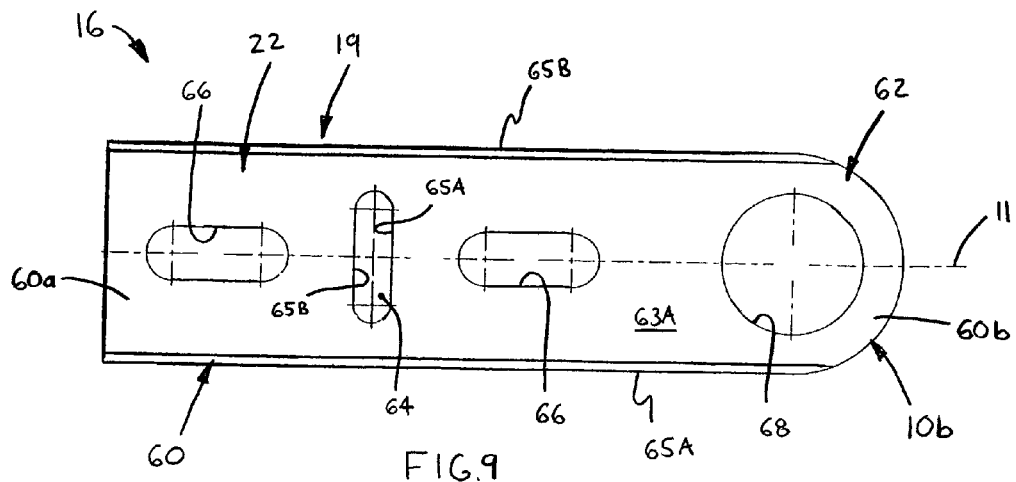
FIG. 9 is a top plan view of a second arm section of the adjustable control arm.
Figure 10:
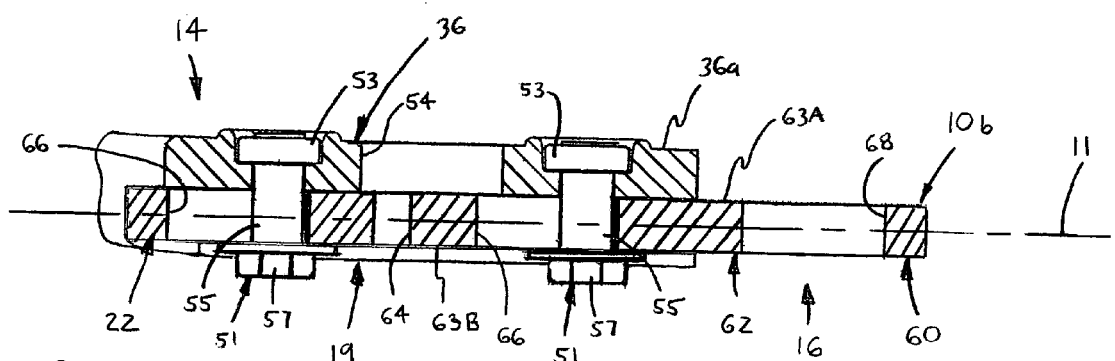
FIG. 10 is an enlarged, broken-away cross-sectional view of the adjustable control arm, showing the second arm section located in a first, innermost position with respect to the first arm section.
Figure 11:
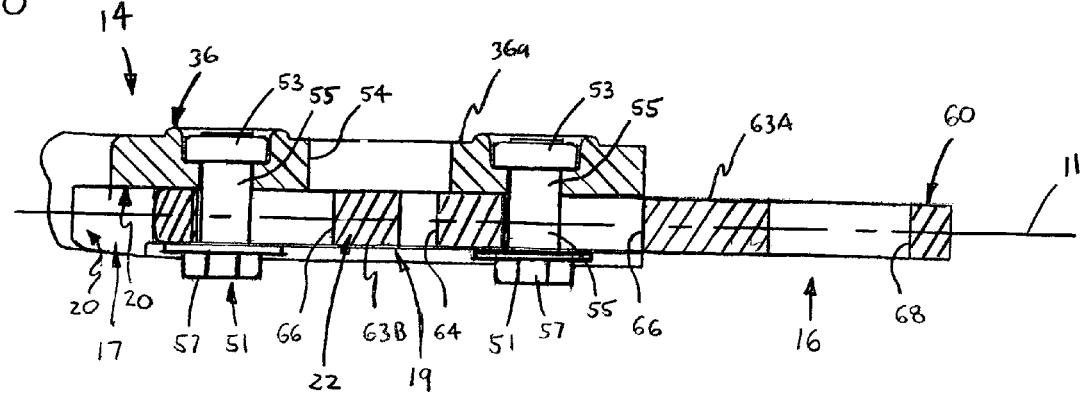
FIG. 11 is another view of the control arm of FIG. 10, showing the second arm section located at a second, outermost position with respect to the first arm section.

Further, the slide portion 22 of the second arm section 16 preferably includes at least one and preferably two slotted clearance openings 66 extending generally longitudinally through the plate-like body 60 and generally along the arm centerline 11. Each slotted opening 66 is generally aligned with one of the two fastener clearance holes 50 of the first arm section 14, such that a fastener 51 inserted through one of the first arm section holes 50 also extends through a portion of the aligned second arm section slotted opening 66. With this structure, the second arm section 16 may be releasably fixed or connected with the first arm section 14 at any one of plurality of different axial positions along the arm centerline 11. An innermost position of the slide portion 22 is depicted in FIG. 9 and an outermost position is depicted in FIG. 10, the slide portion 22 also being positionable at any axial location therebetween.

Preferably, the adjustable control arm 10 further comprises two fasteners 51 that each include a rod 55, which is at least partially threaded, and a head 57 disposed at one end of the rod 55. The two arm sections 14, 16 are releasably connected or fixed together by inserting the rod 55 of each fastener 51 through one slotted opening 56 and the aligned clearance hole 50, and then threadably engaging the rod free end 55*a* with one nut 53 disposed in a rectangular recess 54 of the first arm section 14. The fastener 51 is rotated until the head 57 clamps against the body lower surface 63B and the nut 53 clamps against the recess clamp surface 56, the recess retainer surface 58 preventing rotation of the nut 53. As such, when the first and second arm sections 14, 16 are so connected, relative displacement between the arm sections 14, 16 is substantially prevented, thereby maintaining the camber C of the associated wheel 3 at a specific, desired value. However, as discussed above, the two arm sections 14, 16 may alternatively be releasably fixed or connected by any other appropriate means, such as for example, by one or more clamps, keys, etc.

Referring to FIGS. 9-13, the slide portion 22 of the second arm section 16 also preferably includes a slotted adjustment opening 64 extending generally transversely across the elongated body 60, and thus generally perpendicular with respect to the arm centerline 11. The slotted opening 64 has facing inner and outer contact or drive surfaces 65A, 65B which are each contactable by a drive pin 74 of the tool 70 to displace the second arm section 16 with respect to the first arm section 14 in alternative directions along the arm centerline 11, as discussed in further detail below. Furthermore, the connective portion 62 of the second arm section 16 preferably includes a generally circular opening 68 sized to receive a portion of the ball joint members 21, which is configured to pivotally connect the second arm section 16, and thereby the entire adjustable control arm 10, with the support 15.

Although the above-described structures for providing a releasable connection of the first and second arm sections 14, 16 is presently preferred, it is within the scope of the present invention to construct the adjustable control arm 10 in any other manner. For example, the first arm section 14 may be formed with slotted clearance openings that are generally aligned with circular fastener openings in the second arm section 16, so that fasteners may be inserted through the aligned holes/slotted openings to releasably connect the two arm sections 14, 16 (not shown). Further for example, the second arm section 16 may be provided with a tool opening sized to receive an adjustment tool 70 (described below) and the first arm section 14 may be provided with the slotted adjustment opening configured to receive a drive pin 74 of the tool 70 (arm structure not shown). As yet another example, the adjustable control arm 10 may be formed without either the tool opening 54 or the adjustment opening 64, such that the second arm section 16 (when unconnected) is slidably displaced with respect to the first arm section 14 by other appropriate means (e.g., tapping with a hammer, etc.).

Figure 3:
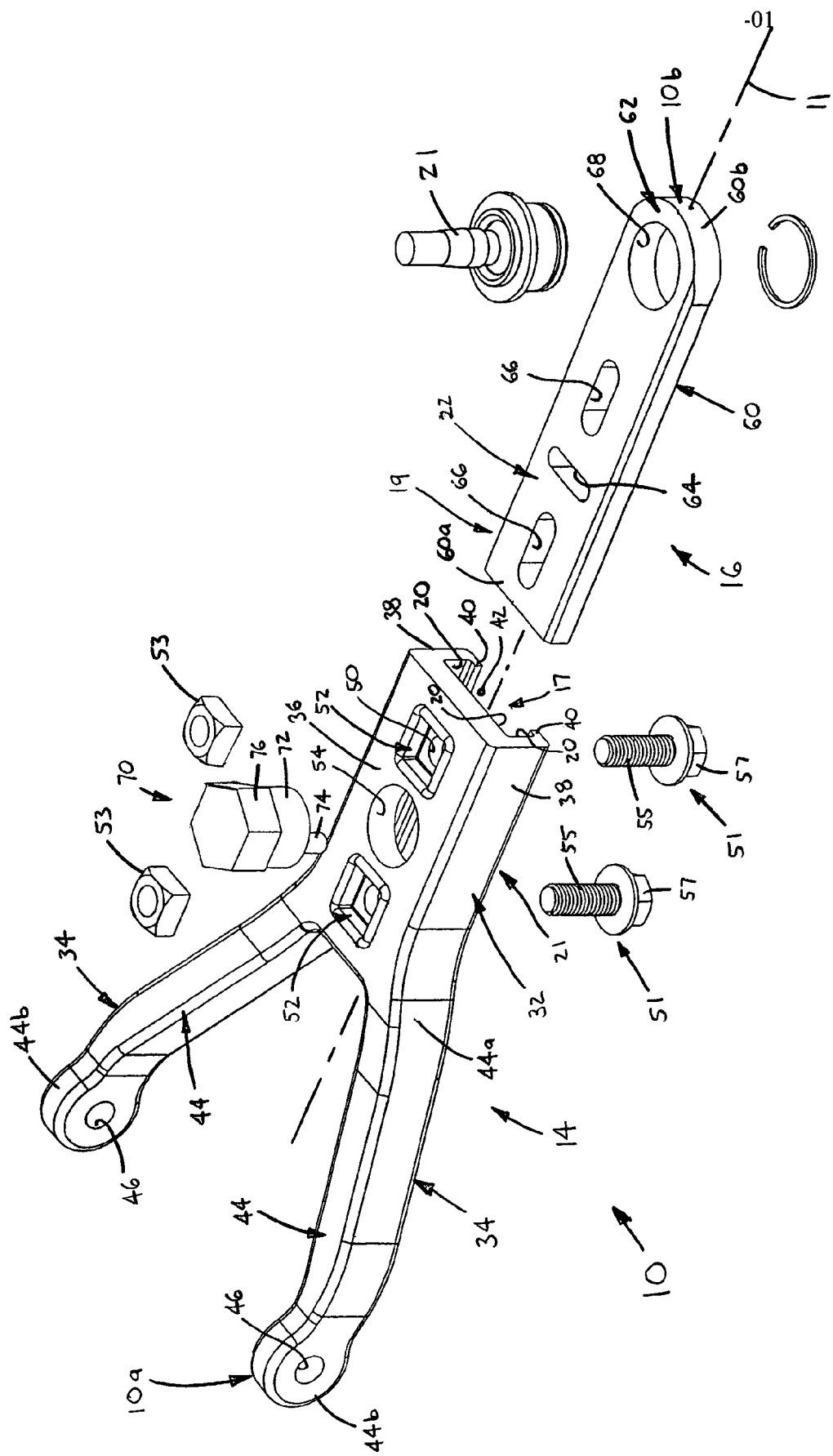
FIG. 3 is an exploded view of the control arm of the present invention.
Figure 12:
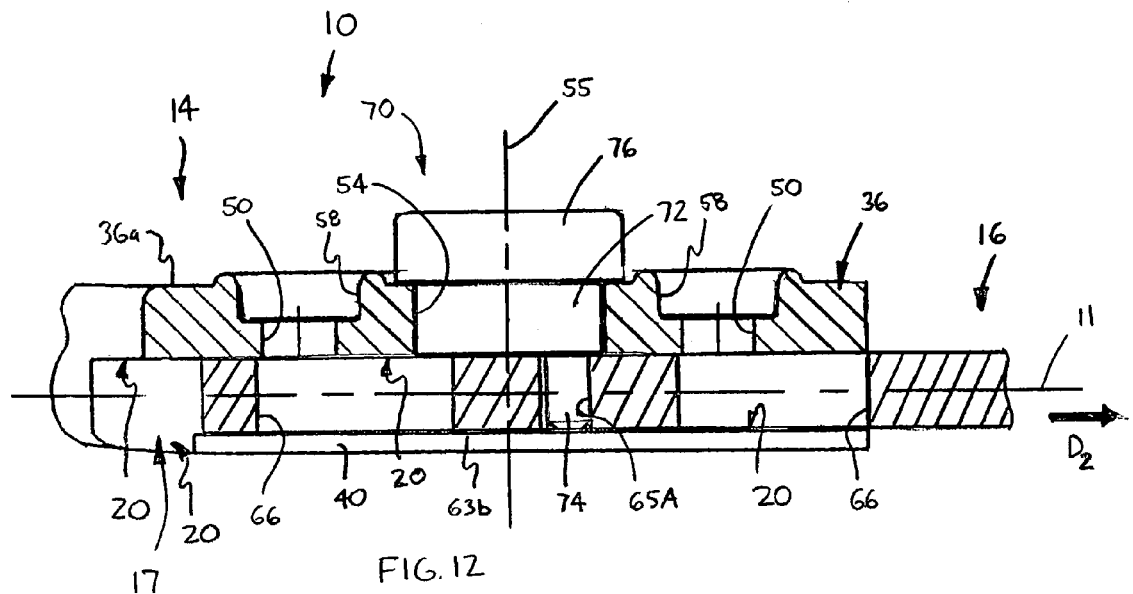
FIG. 12 is a greatly enlarged, broken-away cross-sectional view of the adjustable control arm, showing an adjustment tool displacing the second arm section in an outward direction.
Figure 13:
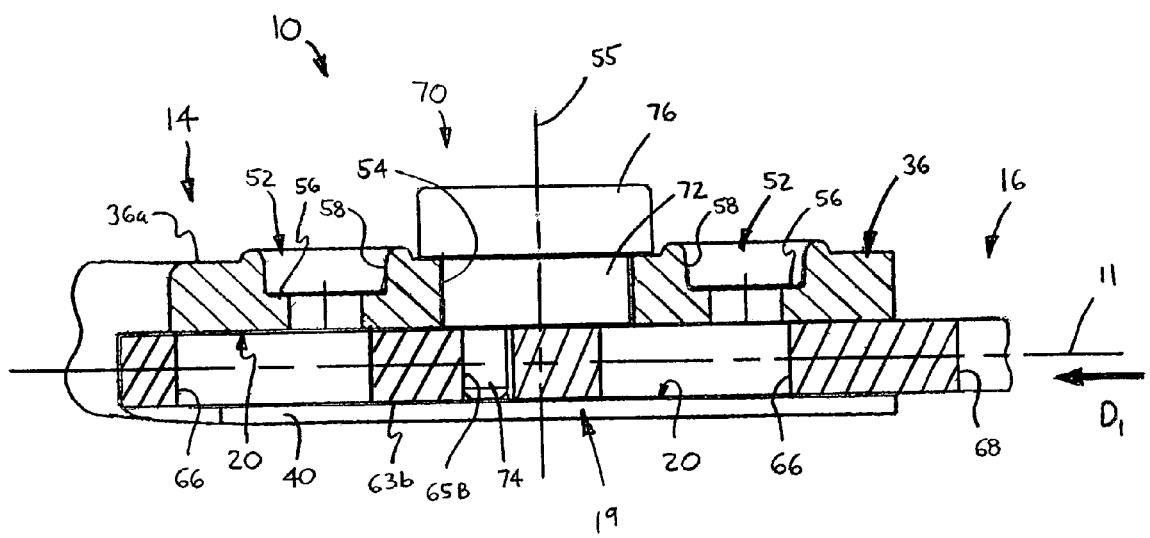
FIG. 13 is another view of the control arm of FIG. 12, showing the adjustment tool displacing the second arm section in an inward direction.

Referring now to FIGS. 3, 12 and 13, the adjustable control arm 10 preferably further includes an adjustment tool 70 engageable with the two arm sections 14, 16 and configured to displace the second arm section 16 with respect to the first arm section 14 when the preferred fasteners 51 (or other connective devices) are loosened or removed. The adjustment tool preferably includes a generally circular cylindrical main body 72, the drive pin 74 extending from one end 72*a* of the main body 72, and a head 76 disposed at the body other end 72*b*. The cylindrical main body 72 is sized so as to be removably disposeable within the circular tool opening 54 of the first arm section 14, such that the drive pin 74 extends into the slotted adjustment opening 64 of the second arm portion 16. Although it is presently preferred that the adjustment tool 70 is removably disposed within the adjustable arm 10 only when adjustment of arm length is desired, the tool 70 may be configured to be retained within the tool opening 54 or otherwise coupled with the control arm 10 (e.g., by an attachment chain).

With this structure, when the tool main body 70 is rotated within the first arm section circular tool opening 54 about the axis 55, the drive pin 74 pushes against one of the two adjustment opening drive surfaces 65A, 65B of the second arm section 16, causing the second arm section 16 to slidably displace with respect to the first arm section 14. More specifically, the tool 70 may be rotated such that the drive pin 74 pushes against the outer drive surface 65A to displace the second arm section 16 in the outward axial direction $D_2$ along the centerline 1, as shown in FIG. 12. Alternatively, when the tool 70 is rotated such that the drive pin 74 pushes against the inner drive surface 65B, the second arm section 16 displaces in the inward axial direction $D_1$ along the centerline 11, as shown in FIG. 13. Preferably, the adjustment tool 70 is rotated within the hole 50 by means of another tool, such as wrench (none shown), engageable with the tool head 76. As the tool opening centerline 51 extends generally vertically, as discussed above, the wrench or other tool will pivot or rotate within a generally horizontal plane during such adjustment.

Referring now to FIGS. 3 and 10-15, the adjustable control arm 10 of the present invention, as described in detail above, functions generally in the following manner. The adjustable control arm 10 is primarily used to movably support the associated wheel 3, i.e., in combination with the remainder of the suspension mechanism 12. Thus, the second arm section 16 is generally releasably fixed or attached to the first arm section 14 such that the camber C of the associated wheel 3 is maintained at about a particular value as the wheel 3 rotates about the horizontal axis 29, pivots about the vertical steering axis 25, and/or displaces vertically by action of the suspension mechanism 12 (see FIG. 3). However, when it is desired to adjust the camber C of the wheel 3, the two preferred fasteners 51 are first removed so as to release or disconnect the second arm section 16 from the first arm section 14. Then, the camber C is adjusted by slidably displacing the second arm section slide portion 22 along the first arm section rail surfaces 20, thus linearly displacing the second arm section 16 along the centerline 11 with respect to the first arm section 14, by an appropriate distance along the axis 11 and in the appropriate direction $D_1$ or $D_2$ to bring the wheel camber C to the desired value. When the camber C has been so adjusted, the second arm section 16 is reconnected with or reaffixed to the first arm section 14, preferably by installing the two fasteners 51, such that the overall length $L_O$ of the adjustable control arm 10 remains at a specific value (e.g., $L_{E1}$) and the wheel camber C is maintained at the desired value.

Due to the structure of the two arm sections 14, 16 as described above, the adjustable control arm 10 of the present invention is capable of being adjusted, i.e., by slidably displacing the second arm section 16, even when the weight of the vehicle 1 is being supported by the wheels 3. In other words, the vehicle 1 does not have to be supported by a lift or jack(s) in order to adjust wheel camber C, which is necessary process for adjusting camber with certain known suspension mechanisms. Further, as the adjustment tool 70 rotates about a generally vertical axis 55, manipulation of the tool 70 with an appropriate device (e.g., a wrench) is relatively easy to perform during camber adjustment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. An adjustable control arm for a suspension of a vehicle, the vehicle including a frame and at least one wheel, the control arm comprising:
    a first arm section connected with the frame; and
    a second arm section connected with the wheel and coupled with the first arm section such that the second section is releasably fixable to the first section and alternatively displaceable with respect to the first section so as to adjust camber of the wheel, the first and second arm sections remaining generally coupled together during displacement of the second section;
    wherein one of the first and second arm sections has a pair of facing rail surfaces and the other one of the first and second arm sections has a slide portion disposed generally between the two rail surfaces, the slide portion being slidably displaceable along the rail surfaces when the second arm section displaces with respect to the first arm section.

2. The adjustable control arm as recited in claim 1 wherein the suspension further includes a wheel support with upper and lower ends, the wheel being generally mounted to the support, the second arm section is connected with one of the support upper and lower ends, the vehicle frame is coupled with the other one of the support upper and lower ends, and displacement of the second arm section with respect to the first arm section pivots the support with respect to the frame to adjust camber of the wheel.

3. The adjustable control arm as recited in claim 2 wherein the suspension further includes a fixed control arm having an inner end connected with the vehicle frame and an outer end pivotally connected with the support upper end, such that the fixed arm pivotally connects the wheel support with the frame.

4. The adjustable control arm as recited in claim 1 wherein the suspension further includes a fixed control arm having an inner end connected with the vehicle frame and an outer end pivotally connected with the wheel, the fixed control arm having a generally fixed length such that a distance between the first and second ends remains substantially constant, the fixed control arm being spaced vertically from the adjustable control arm.

5. The adjustable control arm as recited in claim 4 wherein the second arm section provides an adjustable arm outer end pivotally connected with the wheel and displacement of the second arm section with respect to the first arm section pivots the wheel about the two arm outer ends to adjust camber of the wheel.

6. The adjustable control arm as recited in claim 1 wherein the control arm has a generally longitudinal centerline, the wheel has upper and lower ends, the second arm section is linearly displaceable generally along the centerline in a first direction so as to pivotally displace the wheel in a first angular direction and move the wheel lower end generally toward the vehicle frame, and the second arm section is alternatively linearly displaceable generally along the centerline in a second, opposing direction so as to pivotally displace the wheel in a second angular direction and move the wheel upper end generally toward the vehicle frame.

7. The adjustable control arm as recited in claim 1 wherein the first arm section provides an arm inner end connected with the frame, the second arm section provides an arm outer end connected with the wheel, and displacement of the second section with respect to the first section varies a spacing distance between the arm inner and outer ends.

8. The adjustable control arm as recited in claim 1 wherein the first arm section provides an arm inner end connected with the frame and the second arm section provides an arm outer end connected with the wheel, a distance between the inner and outer ends defines an overall length of the adjustable control arm, and displacement of the second arm section varies the control arm overall length.

9. The adjustable control arm as recited in claim 1 wherein one of the first and second arm sections has a cavity and the other one of the first and second arm sections has an engagement portion disposed within the cavity so as to couple the two arm sections, the engagement portion being fixedly connectable to the one arm section to releasably connect the second arm section to the first arm section and alternatively displaceable within the cavity when the second arm section displaces with respect to the first arm section.

10. The adjustable control arm as recited in claim 9 wherein the one arm section has a central axis extending longitudinally through the cavity and the engagement portion of the other arm section is linearly displaceable generally along the axis when the second arm section displaces with respect to the first arm section.

11. The adjustable control arm as recited in claim 1 wherein the adjustable control arm has a generally longitudinal centerline extending between the frame and the wheel, the two rail surfaces extending generally parallel with respect to and being disposed on opposing sides of the centerline such that the slide portion displaces generally along the centerline.

12. The adjustable control arm as recited in claim 1 wherein:
    one of first and second arm sections has a generally circular opening and the other one of first and second arm sections has a slotted opening with facing drive surfaces, the slotted opening being at least partially aligned with the circular opening; and the adjustable control arm further comprises an adjustment tool having a generally circular cylindrical body removably disposeable within the circular opening and a pin extending from the cylindrical body and disposeable within the slotted opening such that when the cylindrical body is rotated within the circular opening, the pin pushes against one of the two drive surfaces so as to displace the second arm section with respect to the first arm section.

13. The adjustable control arm as recited in claim 12 wherein the adjustable control arm has a longitudinal axis extending between the frame and the wheel and the one arm section has a central axis extending through the circular opening and perpendicularly with respect to the longitudinal axis, the tool cylindrical body being rotatable about the central axis so as to displace the pin generally along the control arm axis.

14. The adjustable control arm as recited in claim 13 wherein the slotted opening extends generally transversely in the other arm section and generally perpendicularly with respect to the control arm axis.

15. The adjustable control arm as recited in claim 1 wherein:

one of the first and second sections has at least one generally longitudinally-extending slotted opening; and the control arm further comprises a fastener connectable with the other one of the first and second arm sections, the fastener extending through the slotted opening and being engageable with the one arm section to releasably attach the second arm section with the first arm section.

16. The adjustable control arm as recited in claim 15 wherein the other arm section has a clearance opening generally aligned with the slotted opening and the fastener extends through both the slotted and clearance openings to fixedly connect the two arm sections.

17. A suspension mechanism for a suspension of a vehicle, the vehicle including a frame and at least one wheel, the suspension mechanism comprising:

a fixed control arm having a first end connected with the frame and a second connected with the wheel, the fixed arm having being formed such that a distance between the arm first and second ends remains substantially constant; and an adjustable control arm spaced vertically from the fixed control arm and including a first arm section connected with the frame and a second arm section connected with the wheel, the second arm section being coupled with the first arm section such that the second section is releasably fixable to the first section and alternatively displaceable with respect to the first section so as to pivot the wheel about the fixed arm second end to adjust camber of the wheel, the first and second arm sections remaining generally coupled during displacement of the second section, one of the first and second arm sections having a pair of facing rail surfaces and the other one of the first and second arm sections having a slide nortion disposed generally between the two rail surfaces, the slide portion being slidably displaceable along the rail surfaces when the second arm section displaces with respect to the first arm section.

18. The suspension mechanism as recited in claim 17 wherein the first and second arm sections of the adjustable control arm remain generally coupled together during displacement of the second section with respect to the first section.

19. The suspension mechanism as recited in claim 17 wherein the fixed arm first end and the adjustable arm first section are each pivotally connected with the frame and the fixed arm second end and the adjustable arm second section are each pivotally connected with the wheel.

20. An adjustable control arm for a suspension of a vehicle, the vehicle including a frame and at least one wheel, the control arm comprising:

a first arm section connected with the frame; and a second arm section connected with the wheel and coupled with the first arm section such that the second section is releasably fixable to the first section and alternatively displaceable with respect to the first section so as to adjust camber of the wheel, the first and second arm sections remaining generally coupled together during displacement of the second section;

wherein one of first and second arm sections has a generally circular opening and the other one of first and second arm sections has a slotted opening with facing drive surfaces, the slotted opening being at least partially aligned with the circular opening; and the adjustable control arm further comprises an adjustment tool having a generally circular cylindrical body removably disposeable within the circular opening and a pin extending from the cylindrical body and disposeable within the slotted opening such that when the cylindrical body is rotated within the circular opening, the pin nushes against one of the two drive surfaces so as to displace the second arm section with respect to the first arm section.

21. An adjustable control arm for a suspension of a vehicle, the vehicle including a frame and at least one wheel, the control arm comprising:

a first arm section connected with the frame; and a second arm section connected with the wheel and coupled with the first arm section such that the second section is releasably fixable to the first section and alternatively displaceable with respect to the first section so as to adjust camber of the wheel, the first and second arm sections remaining generally coupled together during displacement of the second section;

wherein one of the first and second sections has at least one generally longitudinally-extending slotted opening; and the control arm further comprises a fastener connectable with the other one of the first and second arm sections, the fastener extending through the slotted opening and being engageable with the one arm section to releasably attach the second arm section with the first arm section.

* * * * *